(12) United States Patent
Fujiwara

(10) Patent No.: US 11,142,069 B2
(45) Date of Patent: Oct. 12, 2021

(54) CONTROL DEVICE FOR CONTROLLING VEHICLE, METHOD FOR CONTROLLING VEHICLE, AND STORAGE MEDIUM

(71) Applicant: HONDA MOTOR CO., LTD., Tokyo (JP)

(72) Inventor: Takao Fujiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 16/577,235

(22) Filed: Sep. 20, 2019

(65) Prior Publication Data

US 2020/0009963 A1  Jan. 9, 2020

Related U.S. Application Data

(63) Continuation of application No. PCT/JP2017/012646, filed on Mar. 28, 2017.

(51) Int. Cl.
| | |
|---|---|
| *B60K 28/02* | (2006.01) |
| *G06F 40/40* | (2020.01) |
| *F02D 17/02* | (2006.01) |
| *H04W 4/44* | (2018.01) |
| *G06Q 30/06* | (2012.01) |

(52) U.S. Cl.
CPC .............. *B60K 28/02* (2013.01); *F02D 17/02* (2013.01); *G06F 40/40* (2020.01); *G06Q 30/0645* (2013.01); *H04W 4/44* (2018.02)

(58) Field of Classification Search
CPC ......... B60K 28/02; G06F 40/40; G06F 40/58; F02D 17/02; H04W 4/44; H04W 4/50; G06Q 30/0645; G06Q 50/10; B60W 2540/043; B60W 50/0098; B60W 2050/0075; H04L 67/306; G01C 21/36
See application file for complete search history.

(56) References Cited

U.S. PATENT DOCUMENTS

| | | | |
|---|---|---|---|
| 3,673,718 A | * | 7/1972 | Bernard .................... G09F 7/00 40/5 |
| 8,731,739 B2 | | 5/2014 | Yamada et al. |
| 9,616,849 B1 | * | 4/2017 | Tucker .................... F02D 41/26 |
| 2010/0045451 A1 | * | 2/2010 | Periwal .................... B60Q 9/00 340/439 |
| 2010/0106534 A1 | * | 4/2010 | Robinson ............... G06Q 10/02 705/5 |

(Continued)

FOREIGN PATENT DOCUMENTS

| | | |
|---|---|---|
| JP | H11-219105 A | 8/1999 |
| JP | 2000242887 A | 9/2000 |

(Continued)

OTHER PUBLICATIONS

Office Action for Japanese Patent Application No. 2019508385 dated Aug. 3, 2020.

(Continued)

*Primary Examiner* — Sizo B Vilakazi
*Assistant Examiner* — Brian R Kirby
(74) *Attorney, Agent, or Firm* — Thomas | Horstemeyer, LLP

(57) ABSTRACT

A control device that controls a vehicle obtains information of a user of the vehicle, and controls, based on the information of the user, output of the vehicle on a per-user basis.

11 Claims, 2 Drawing Sheets

(56) References Cited

U.S. PATENT DOCUMENTS

| | | | |
|---|---|---|---|
| 2012/0143395 A1 | 6/2012 | Yamada et al. | |
| 2014/0165159 A1* | 6/2014 | Baade | H04L 63/08 |
| | | | 726/4 |
| 2014/0309864 A1* | 10/2014 | Ricci | G01C 21/365 |
| | | | 701/36 |
| 2015/0194082 A1* | 7/2015 | McEwan | B60Q 1/444 |
| | | | 40/209 |
| 2016/0082902 A1* | 3/2016 | Belegu | B60R 13/10 |
| | | | 340/468 |
| 2016/0107577 A1* | 4/2016 | Niles | G06F 9/454 |
| | | | 704/3 |
| 2016/0319761 A1* | 11/2016 | Yu, Jr. | B60Q 9/00 |
| 2017/0039631 A1* | 2/2017 | Luke | G06Q 30/0645 |
| 2018/0005526 A1* | 1/2018 | Sendhoff | G08G 1/09623 |

FOREIGN PATENT DOCUMENTS

| | | |
|---|---|---|
| JP | 2011-207397 A | 10/2011 |
| JP | 2015-64675 A | 4/2015 |
| JP | 2015-134532 A | 7/2015 |
| JP | 2016-74317 A | 5/2016 |
| JP | 2016-124376 A | 7/2016 |
| WO | 2010143264 A1 | 12/2010 |
| WO | 2016/056213 A1 | 4/2016 |
| WO | 2018/179090 A1 | 10/2018 |

OTHER PUBLICATIONS

International Search Report for PCT/JP2017/012646 dated Jun. 27, 2017 (partially translated).
IPRP for PCT/JP2017/012646 mailed Nov. 5, 2018.
Japanese Office Action (with partial translation) for Japanese Patent Application No. 2019-508385 dated Mar. 29, 2021.

* cited by examiner

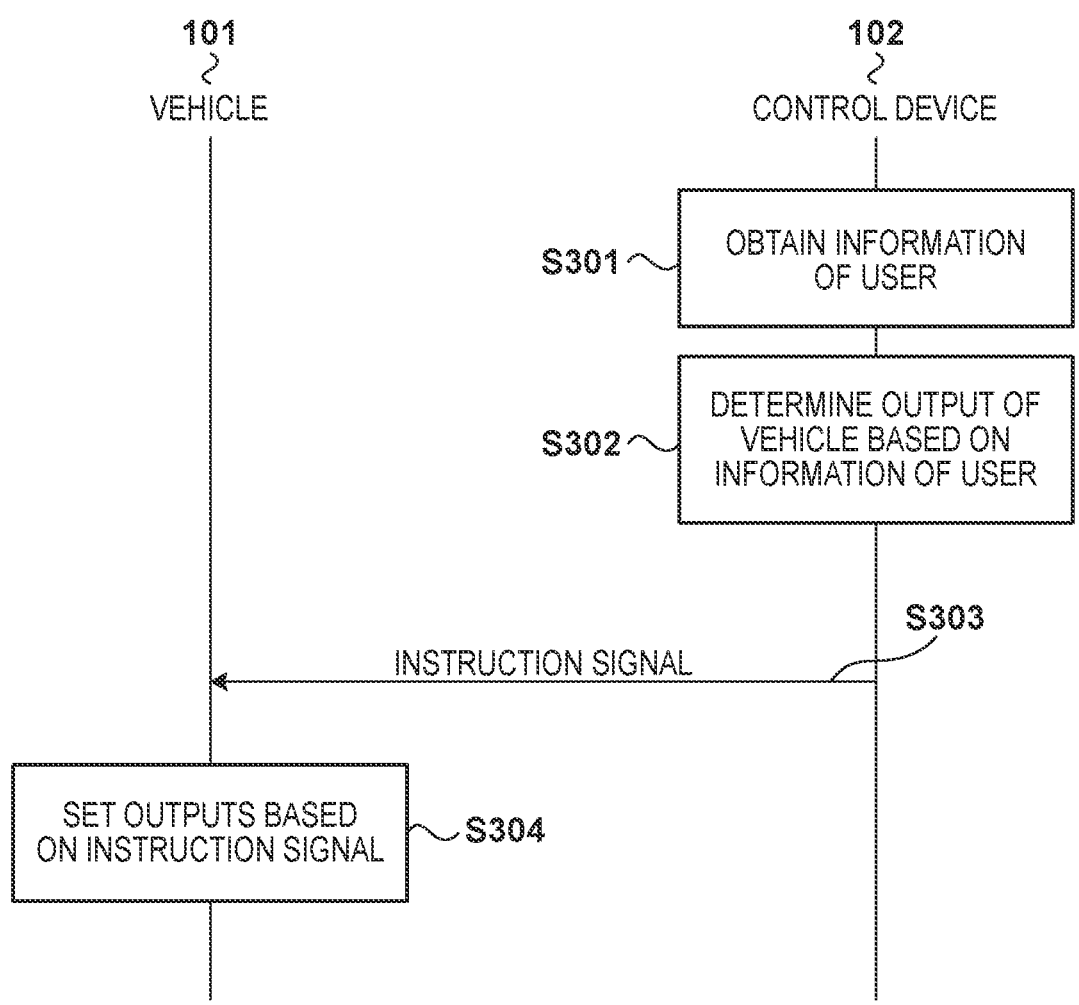

CONTROL DEVICE FOR CONTROLLING VEHICLE, METHOD FOR CONTROLLING VEHICLE, AND STORAGE MEDIUM

CROSS-REFERENCE TO RELATED APPLICATION

This application is a continuation of International Patent Application No. PCT/JP2017/012646 filed on Mar. 28, 2017, the entire disclosures of which is incorporated herein by reference.

BACKGROUND OF THE INVENTION

Field of the Invention

The present invention relates to a control device for controlling a vehicle, a method for controlling a vehicle, and a program, and specifically to a technique to configure the settings of a vehicle.

Description of the Related Art

Vehicle lending services, such as a car rental and a motorbike rental, are widely used.

Currently, agencies that lend vehicles hold a wide variety of vehicles in a large number in order to lend vehicles that can be used in accordance with, for example, the types of driver's licenses of vehicle users. However, for example, if license types that correspond to lent vehicles are dominated by a certain license type, vehicles that are only maintained despite its unused state will exist, which needlessly involves costs. Also, for example, visitors from foreign countries who do not understand the language and regulations of a country or region in which vehicles are used have difficulty renting vehicles because of that language and regulations; this limits the availability of services. As such, incompatibility between vehicles and users could give rise to the aforementioned problems or other additional problems.

SUMMARY OF THE INVENTION

A control device according to one aspect of the present invention is a control device for controlling a vehicle, and includes: an obtaining unit configured to obtain information of a user of the vehicle; and a control unit configured to, based on the information of the user, control output regarding travelling of the vehicle and not regarding presentation of information to the user on a per-user basis.

Further features of the present invention will become apparent from the following description of exemplary embodiments (with reference to the attached drawings).

BRIEF DESCRIPTION OF THE DRAWINGS

The accompanying drawings are included in the specification, form a part of the specification, and are intended to illustrate the embodiments of the present invention and to explain a principle of the present invention, together with the described content.

FIG. 3 is a diagram showing an example of the flow of processing executed in the system.

DESCRIPTION OF THE EMBODIMENTS

The following describes an aspect of practicing the present invention with reference to the drawings.

(System Configuration)

Figure 1:
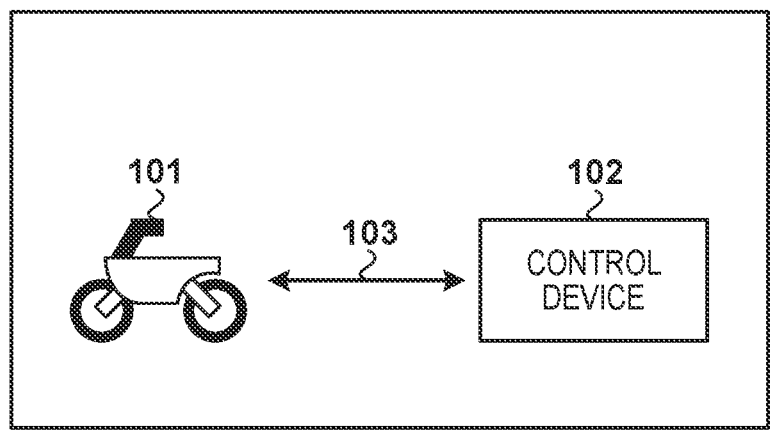
FIG. 1 is a diagram showing an exemplary schematic configuration of a system.

FIG. 1 shows an exemplary schematic configuration of a system according to the present embodiment. In one example, the present system is configured to include a vehicle 101, a control device 102, and a line 103 by which the vehicle 101 and the control device 102 are connected to each other. The vehicle 101 is, for example, an automotive vehicle, such as a two-wheeled automotive vehicle. Note that the vehicle 101 may be, for example, a vehicle that is operated by the combustion of fuel, such as gasoline, or may be an electric automotive vehicle (two-wheeled electric vehicle). The control device 102 is a device that controls the outputs of the vehicle 101. The outputs of the vehicle 101 include, for example, engine displacement, motor output, a language used on an information presentation device that presents information to a user, such as a navigation device installed in the vehicle 101, and so forth. The line 103 is a wired or wireless line that is used in communication between the vehicle 101 and the control device 102.

As shown in FIG. 1, the control device 102 could be equipment that exists outside the vehicle 101. Also, in this case, the control device 102 could be, for example, a personal computer or a similar terminal of a vehicle lending agency, a server on a network, and so forth. However, the control device 102 may be equipment that is provided inside the vehicle 101. Note that when the control device 102 is a device that exists inside the vehicle 101, the line 103 is, for example, a wired communication cable. When the control device 102 exists outside the vehicle 101, the line 103 could be a wireless line. Note that although FIG. 1 shows an example in which the vehicle 101 and the control device 102 are connected directly to each other, no limitation is intended by this. For example, the vehicle 101 and the control device 102 could be connected to each other via equipment that relays communication of others, such as a base station, a router, and a gateway for wireless communication. Furthermore, even when the control device 102 exists outside the vehicle 101, a wired line could be used as the line 103 when configuring the settings by temporarily establishing connection before using the vehicle, when the control device 102 is, for example, a small-sized computer for the vehicle 101, and so forth.

In the present embodiment, the control device 102 obtains information of a user of the vehicle 101, and controls the outputs of the vehicle on a per-user basis based on the obtained information. That is, in a circumstance where different users use one vehicle 101, such as in a vehicle lending service, the control device 102 performs control to change the features of the vehicle 101 in accordance with the attributes of the users. In this way, the use of the vehicle 101 can be facilitated irrespective of the attributes of the users, and sharing of the vehicle through the vehicle lending service and the like is made easy.

Here, the information of the user could be various types of information, such as information of a driver's license, a passport, a visa, and the like of the user, a smartphone or similar information equipment owned by the user, etc. Also, the information of the user may be information of the user accumulated in the network. Examples of the information of the user accumulated in the network include a user account of the user in an arbitrary Web service, information obtained from that user account, and so forth. Furthermore, the information of the user accumulated in the network could be various types of information for identifying predetermined information corresponding to the attributes of that user. For example, in accordance with such attributes as the age, sex, nationality, and country of residence of the user, information that has been collected in relation to another person having similar attributes could be obtained as information of the user for identifying information corresponding to the attributes of that user. Note that after obtaining a large amount of information accumulated in the network, the control device 102 could execute predetermined processing for determining the settings of the vehicle 101 for the user. For example, the control device 102 could determine whether the user understands a specific language and the like from information corresponding to the user account of the user and information related to another person having the same attributes as the user. Note that in this determination, one or more certain languages that have a high possibility of being understood by the user could be selected using artificial intelligence that makes the determination based on, for example, information of the user or another person having the same or similar attributes. Furthermore, information of the preference and the like of the user could also be obtained based on information of the user him/herself and information of another person having similar attributes. Note that the above-described information of the user is merely illustrative, and information other than the above-described information may be obtained.

By way of example, a case will be examined in which the maximum engine displacement of the vehicle 101 is 125 cc or more and the effective engine displacement can be reduced to 50 cc or 125 cc through control of a program. In this case, the control device 102 obtains information related to a driver's license of the user, and when this information indicates that the user holds a driver's license for vehicles with 50 cc but does not hold a driver's license for vehicles with 125 cc, the control device 102 transmits an instruction signal to the vehicle 101 so as to set the effective engine displacement to 50 cc. The vehicle 101 could make the value of the effective engine displacement smaller than the maximum value by, for example, stopping the supply of fuel to a part of a plurality of cylinders that provide a driving force of the vehicle 101. On the other hand, when the information related to the driver's license of the user indicates that the user holds a driver's license for vehicles with 125 cc, the control device 102 transmits an instruction signal to the vehicle 101 so as to set the effective engine displacement to 125 cc. In this way, using information related to the driver's licenses of users, for example, the driving force of one vehicle 101 can be restricted appropriately with respect to each of a user who holds only a driver's license for vehicles with 50 cc and a user who holds a driver's license for vehicles with 125 cc. Furthermore, for example, the vehicle lending agency is no longer required to needlessly own a large number of vehicles. The vehicle 101 holds in advance, for example, a program for using an effective engine displacement of 50 cc and a program for using an effective engine displacement of 125 cc, and selects and executes one of the programs based on an instruction signal from the control device 102. In this way, the control device 102 can appropriately set the outputs related to engine displacement of the vehicle 101 for each user of that vehicle 101. Note that when the vehicle 101 is an electrically driven vehicle, the maximum value of the motor output can be controlled based on information of a driver's license. For example, the vehicle 101 could hold a program for using, as the motor output, the output corresponding to an engine displacement of 50 cc and a program for using, as the motor output, the output corresponding to an engine displacement of 125 cc, and select and execute a program to be used based on an instruction signal from the control device 102. In this case, similarly to the above-described processing, the control device 102 could transmit, to the vehicle 101, an instruction signal that is based on whether the obtained information indicates that the user holds a driver's license for 50 cc or less or a driver's license for 125 cc. That is, the control device 102 could transmit the same instruction signal to the vehicle 101 irrespective of whether the vehicle 101 is an electrically driven vehicle or a fuel-driven vehicle. In this way, a configuration of the control device 102 can be simplified. Note that the control device 102 may transmit different instruction signals to the vehicle 101 depending on whether the vehicle 101 is an electrically driven vehicle or a fuel-driven vehicle. In this way, even if a driver's license category is set differently between the electrically driven vehicle and the fuel-driven vehicle, the control device 102 can flexibly set the outputs of the vehicle. Note that although the foregoing description has been given mainly in relation to a two-wheeled vehicle, the settings may be configured in accordance with license categories, such as an ordinary automotive vehicle license and a medium-size automotive vehicle license, also in the case of a four-wheeled vehicle, for example. In this case, the vehicle 101 could, for example, monitor the weight of a load and display a warning when the weight exceeds a limit corresponding to a license category.

Note that the vehicle 101 could change the color of a license plate based on the settings of the engine displacement and the motor output. For example, the vehicle 101 sets the color of the license plate to pink in the case of an engine displacement of 125 cc, and sets the color of the license plate to white in the case of an engine displacement of 50 cc. Note that the vehicle 101 can change the color of the license plate, for example, by illuminating the license plate of a predetermined color (e.g., white) with light having a setting-based color (e.g., pink), or by causing the license plate to emit light having a setting-based color. When the vehicle 101 can independently change the color of the license plate based on the output, such as the engine displacement, the control device 102 need not transmit an instruction signal in relation to the color of the license plate. Meanwhile, the control device 102 may, for example, obtain information of a country or region in which the vehicle 101 is used, and transmit an instruction signal that designates the color of the license plate in accordance with the rules in that country or region. This enables the color of the license plate to match the color prescribed in a law and the like. Furthermore, the vehicle 101 may be configured to change a display mode of the license plate other than the color based on the settings of the engine displacement and the motor output. For example, in some countries and regions, the characters (e.g., alphabets) written on the license plate could vary depending on the engine displacement. For this reason, the vehicle 101 could be configured to change the characters within the license plate in accordance with the engine displacement and the motor output. In this case, information of matters written on the license plate, which have been pre-registered for, for example, each settable engine displacement or motor output, may be stored in the vehicle 101, and the vehicle 101 may obtain the information of the (e.g., temporary) written matters via, for example, the network. Furthermore, on an electrically driven vehicle, the levels of an exhaust sound that is output in a simulated manner and a vehicle approach sound for informing the surroundings of the approach of the vehicle may be changed in accordance with the magnitude of the motor output. For example, a setting for increasing the vehicle approach sound with an increase in the motor output could be configured.

In addition, the control device 102 could obtain information related to the nationality and country of residence of the user, and determine a language to be used in giving notification via information presentation equipment on the vehicle 101 based on that information. Then, using the determined language, the control device 102 could transmit an instruction signal for performing one or both of screen output and audio output to the vehicle 101. In response to the instruction signal from the control device 102, the vehicle 101 sets the language to be used on the information presentation equipment. The information presentation equipment could be, for example, a navigation device or a built-in guidance device that indicates a vehicle operation and the like inside the vehicle 101. The navigation device and the built-in guidance device perform at least one of screen output and audio output. For example, the vehicle 101 could give a presentation of directions, an explanation of facilities, etc., or provide guidance on a method for operating the vehicle 101, such as a fueling and power supply method and the like, in the designated language. Furthermore, the control device 102 could determine which one of km/h and mile/h is to be used in displaying a vehicle speed based on the information related to the nationality and country of residence of the user, and notify the vehicle 101 of the result of this determination, and the vehicle 101 could set the display of the vehicle speed accordingly. Similarly, regarding the display of a traveled distance as well, which one of km and mile is to be used could be determined based on the information related to the nationality and country of residence. In this way, collecting the information related to the nationality and country of residence of the user enables appropriate control over a presentation method related to information output.

When the country or region in which the vehicle 101 is used and the language to be used designated by the control device 102 do not correspond to each other, the vehicle 101 may cause the information presentation equipment to present a commentary related to road legislation in the country or region of use. For example, the vehicle 101 could cause the information presentation equipment to present such a commentary when, for example, the country in which the vehicle 101 is used is Japan and the designated language to be used is French. This enables the user to learn the traffic rules in that region when using the vehicle 101. Note that the vehicle 101 may, based on the information of the nationality and country of residence of the user, display a sign that is easy for that user to understand in place of a traffic sign provided on a road. Note that when, for example, the information presentation equipment is a head-mounted display or the like, the foregoing display may be performed using augmented reality technology or the like whereby, for example, a sign that is easy for the user to understand is displayed in such a manner that the sign is superimposed on a sign observed by that user. This information presentation equipment is mounted on, for example, a visor portion of a helmet, goggles, etc., and is treated as a part of the vehicle 101. At least in the scope of the present specification and the attached claims, not only a main body of an automotive vehicle but also such information presentation equipment is collectively referred to as the vehicle 101.

Note that there are cases where, for example, some users sufficiently understand the language and traffic rules of the country or region in which the vehicle 101 is used, such as a case where there is a discrepancy between the nationality and the place of residence. In these cases, there could be a case where the language corresponding to the nationality need not be used, and a case where the use of the language corresponding to the nationality may not be appropriate. For this reason, the control device 102 could estimate the language that is presumed to be ordinarily used by the user from, for example, a smartphone or network of that user. For example, the language that is ordinarily used by that user could be identified from the language that is set and used on the smartphone, the language that is set and used in a user account related to that user in a Web service, and so forth. Furthermore, information of a region in which the user is normally staying (residing) could be identified from a record remaining on the smartphone and the Web service.

Note that when it is not possible to uniquely identify the language that can be understood by the user, the language that has a high chance of being interpretable by the user could be estimated based on, for example, the attributes of the user, such as the nationality, and information of another person having similar attributes. Note that this estimation may identify one or a few languages using, for example, artificial intelligence, and may be ended when languages have been narrowed down to a plurality of candidates. When the plurality of candidates remain, for example, the vehicle 101 may display these plurality of candidates in a list, and cause the user to select one language. Note that when the language to be used cannot be identified, the control device 102 may make a decision to use a predetermined language, such as English, for example.

Furthermore, the control device 102 could identify, for example, the purpose of use of the vehicle 101, the preference, and the like of the user from information of the user, and cause vehicle 101 to perform information presentation that is suited for that purpose of use, preference, and the like. The control device 102 can estimate whether the user uses the vehicle 101 for the purpose of sightseeing or the user uses the vehicle 101 for the purpose of business from, for example, information of a visa of the user, and change a mode of information presentation in accordance with the result of this estimation. When the user uses the vehicle 101 for the purpose of sightseeing, for example, the control device 102 could mainly present tourist attractions and the like, and reduce the amount of presentation related to business-related landmarks. On the other hand, when the user uses the vehicle 101 for the purpose of business, for example, the control device 102 could mainly present business-related landmarks while reducing the amount of presentation related to tourist attractions and the like. Note that information presentation is not limited to the case of business purpose and the case of sightseeing purpose, and could be suitably performed for a variety of purposes (e.g., based on the settings that have been configured in advance on a per-purpose basis). Furthermore, the control device 102 could, for example, obtain information of the preference and the like of the user from a network and the like, or estimate information of the preference and the like of the user based on the preference and the like of another person having the attributes similar to the attributes of the user, and cause the vehicle 101 to perform information presentation that is suited for that preference and the like. Note that regarding the information of the preference and the like, when an information processing terminal owned by the user, such as a smartphone, hints that the user is a vegetarian, for example, the control device 102 could perform control to cause the vehicle 101 to present information of restaurants that are suited for use by vegetarians. Furthermore, in accordance with, for example, the tendency of facilities that are used by the user with high frequency, the tendency of areas at which the user stops by with high frequency, and so forth, the control device 102 could cause the vehicle 101 to present information corresponding to such tendencies. This can further improve the usability of the vehicle 101 experienced by the user.

Note that the control device 102 may, for example, obtain information of the user from the vehicle 101. For example, the control device 102 could obtain information of a history of driving of the vehicle 101 by the user (e.g., information of an average speed, a time-based distribution of speeds, the number of times sudden braking/sudden starting was performed, traveled lanes, and so forth). In this way, the control device 102 could acknowledge a driving tendency of the user, and update a driving force, a braking force, a vehicle height, and the like to be set for the user having such a driving tendency. Furthermore, by obtaining, for example, information of driving behaviors after the update of the settings, the control device 102 could determine whether the update was appropriate and further update the settings as needed. In this way, the settings of the vehicle 101 can be configured to make driving easier for the user. Furthermore, information related to the user can also be exploited for the settings of other users having the same tendency. Obtaining information related to a large number of users makes it possible to promptly render the settings of the vehicle 101 suitable for the user.

Furthermore, the control device 102 could, for example, obtain information of the position of the vehicle 101 from that vehicle 101. The vehicle 101 could include, for example, a GPS (Global Positioning System) receiver and identify its own position. The control device 102 can change light distributions of headlights of the vehicle 101 in accordance with the result of this identification. The control device 102 could, for example, transmit to the vehicle 101 setting information for directing the headlight axes rightward in a left-hand-traffic country or region, directing the headlight axes leftward in a right-hand-traffic country or region, and so forth. Also, the control device 102 may, for example, change the luminance of the headlights in accordance with the position of the vehicle 101.

Furthermore, when the vehicle 101 is provided with a mechanism that is connectable (in a wireless or wired manner) to a smartphone of the user, for example, the vehicle 101 may notify the control device 102 of information of the connected smartphone. Also, for example, when the vehicle 101 is provided with a mechanism for reading a driver's license, the vehicle 101 may notify the control device 102 of information of that driver's license. In this way, the control device 102 could be accurately notified of information of the user to be associated with the vehicle 101.

The following describes the configurations of the above-described vehicle 101 and control device 102, and the flow of processing that is executed.

(Device Configurations)

Figure 2:
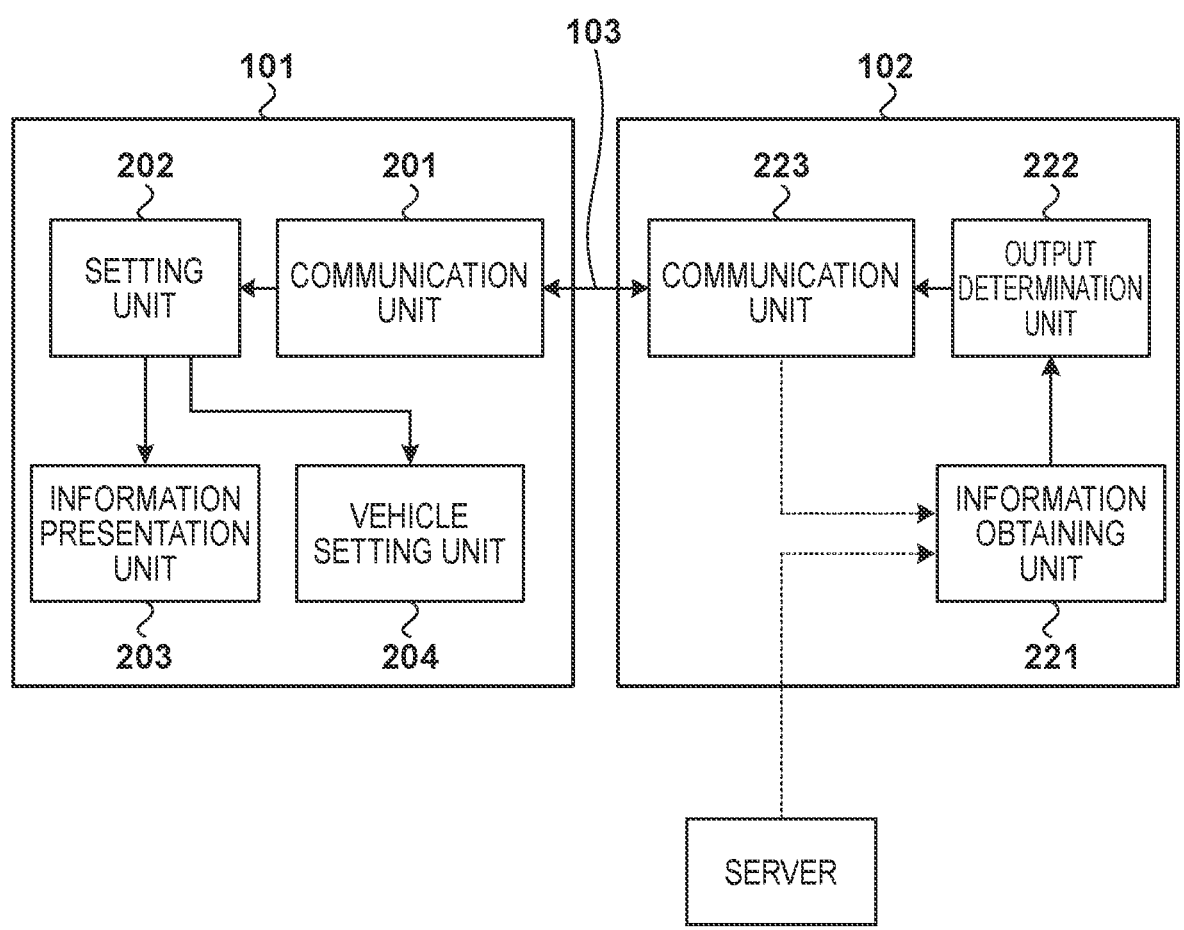
FIG. 2 is a diagram showing exemplary configurations of devices.

FIG. 2 shows exemplary configurations of the vehicle 101 and the control device 102 according to the present embodiment. Note that, for simplicity, FIG. 2 only shows the functions for performing the above-described processing of the present embodiment, and other configurations are omitted in the illustration thereof. For example, although the vehicle 101 has functions as a general vehicle (e.g., mechanisms such as an engine and a brake), FIG. 2 does not illustrate such functions.

The vehicle 101 includes, for example, a communication unit 201, a setting unit 202, an information presentation unit 203, and a vehicle setting unit 204. On the other hand, the control device 102 includes, for example, an information obtaining unit 221, an output determination unit 222, and a communication unit 223. Note that at least a portion of these functions could be realized by one or more processors (a CPU or the like, and a processor for communication) executing a program stored in a storage device, such as a memory. Note that a part or all of these functions may be realized by dedicated hardware. The vehicle 101 and the control device 102 can communicate with each other via the communication unit 201 and the communication unit 223. At this time, the communication line 103 is established using a wireless connection method or a wired connection method that can be used by the communication unit 201 and the communication unit 223. The communication unit 201 and the communication unit 223 are configured to execute signal generation processing, such as modulation, transmission processing for a generated signal, reception processing for a signal transmitted from the other, and extraction of information from a signal, such as demodulation.

In the control device 102, the information obtaining unit 221 obtains information of a user of the vehicle 101. For example, when the control device 102 is an information terminal of a vehicle lending service agency, the information obtaining unit 221 could obtain the information of the user through the input of information of a driver's license of the user. At this time, the information obtaining unit 221 may obtain the information by, for example, reading information of the user from the driver's license that has been scanned, etc. Also, the information obtaining unit 221 could obtain the information of the user from, for example, information equipment owned by the user, such as a smartphone. Furthermore, the information obtaining unit 221 may obtain the information of the user from information stored inside the control device 102 or from a server and the like in a network. Note that the information of the user may include, for example, not only information of the user him/herself, but also information that has been collected in relation to another person having the attributes similar to the attributes of the user. Note that the information obtaining unit 221 may connect to the network via the communication unit 223. That is, the communication unit 223 could be capable of establishing not only connection with the vehicle 101, but also another connection, such as connection to the network, either in parallel or using time division. Also, the information obtaining unit 221 may obtain the information of the user from the vehicle 101 via the communication unit 223. The information of the user mentioned here could be, for example, information on how to drive, etc. In this way, the information obtaining unit 221 could obtain not only information of the driver's license and the like of the user, but also various types of information including information that is presumed to be associated with the user, such as information and a driving tendency of another person having a tendency similar to the tendency of the user, which exist in the network.

The output determination unit 222 determines the outputs of the vehicle 101 based on the information of the user of the vehicle 101 obtained by the information obtaining unit 221. Here, the outputs of the vehicle 101 include, for example, the engine displacement/motor output of the vehicle 101, the direction and luminance of headlights, output concerning the external form of the vehicle 101 itself, such as the color of a license plate, and output concerning information presentation to the user, such as navigation and operational guidance. The output determination unit 222 can determine various outputs of the vehicle 101 as in the above-described example. The communication unit 223 generates an instruction signal for instructing the vehicle 101 to perform the outputs determined by the output determination unit 222, and transmits the instruction signal to the vehicle 101.

In the vehicle 101, the setting unit 202 obtains the instruction signal received from the control device 102 via the communication unit 201, and controls the outputs of the vehicle 101 in accordance with this instruction. For example, the setting unit 202 sets a language used on the information presentation unit 203, which presents such information as navigation and operational guidance to the user, to a language that has been determined by the output determination unit 222 of the control device 102. Also, the setting unit 202 could set the information presentation unit 203 so as to perform processing for, for example, replacing a sign with a sign that can easily be understood by the user and display the latter sign, etc. Furthermore, with respect to the vehicle setting unit 204 that controls, for example, the engine displacement and motor output of the vehicle 101, the direction and luminance of the headlights, and output concerning the external form of the vehicle 101, such as the color of the license plate, the setting unit 202 configures the settings so that the configurations determined by the output determination unit 222 are used.

(Flow of Processing)

Next, a description is given of the flow of processing executed in the vehicle 101 and the control device 102. In the present processing, first, the control device 102 obtains information of a user of the vehicle 101, for example, from a driver's license and information equipment, such as a smartphone, of the user of the vehicle 101, from another device (e.g., a server) in a network, or from the vehicle 101 (S301). Next, the control device 102 determines the outputs to be set on the vehicle 101 based on this obtained information of the user (S302). Then, the control device 102 transmits an instruction signal that gives an instruction for performing the determined outputs to the vehicle 101 (S303). Thereafter, the vehicle 101 sets its own outputs in accordance with the instruction signal from the control device 102 (S304). Note that when the settings of the outputs of the vehicle 101 are not to be changed, the control device 102 may not transmit the instruction signal. In this case, the vehicle 101 does not receive the instruction signal, and thus does not configure the settings of the outputs. Note that in order to notify the control device 102 of the output settings, the vehicle 101 may periodically notify the control device 102 of information of its own state.

As described above, based on information of a user of the vehicle 101, the control device 102 controls the outputs of the vehicle 101 so that the settings of the outputs are suited for the user. This makes it possible to render the configuration of the vehicle 101 appropriate on a per-user basis.

SUMMARY OF EMBODIMENT

1. A control device of the above-described embodiment is a control device (e.g., 102) for controlling a vehicle (e.g., 101), and includes: obtaining means (e.g., 221) for obtaining information of a user of the vehicle; and control means (e.g., 222) for, based on the information of the user, controlling output of the vehicle on a per-user basis.

According to this embodiment, when one vehicle is shared by one or more users, the output of that vehicle can be set in a style suited for each user.

2. In the control device of the above-described embodiment, the information of the user includes information of a nationality or a place of residence of the user.

According to this embodiment, the output of the vehicle can be changed to a style corresponding to the nationality or the place of residence of the user.

3. In the control device of the above-described embodiment, the control means determines, based on the information of the nationality or the place of residence, a language used on presentation means (e.g., 203) for presenting information to the user in the vehicle, and controls the presentation means to perform at least one of screen output and audio output using the language.

According to this embodiment, information can be presented in a style that can be understood by the user of the vehicle. Furthermore, this can consequently make it psychologically easy for the user to rent the vehicle, for example.

4. In the control device of the above-described embodiment, the information of the user includes information related to a driver's license held by the user.

According to this embodiment, the output of the vehicle can be changed in accordance with the type of a vehicle that the user can drive.

5. In the control device of the above-described embodiment, based on the information of the driver's license, the control means controls engine displacement or motor output of the vehicle (e.g., 204).

According to this embodiment, the vehicle can be set so that the vehicle matches the type that the user can drive.

6. In the control device of the above-described embodiment, based on the information of the driver's license, the control means controls a color that illuminates a license plate of the vehicle (e.g., 204).

According to this embodiment, when the output of the vehicle, such as engine displacement, has been changed, the license plate can be observed in a color corresponding to that engine displacement or the like in compliance with, for example, a law.

7. Regarding the control device of the above-described embodiment, the control device is a device that exists outside the vehicle, and further includes communication means (e.g., 223) for communicating with the vehicle.

According to this embodiment, even when the vehicle has a low processing capability, an external device having a high processing capability can determine the output of the vehicle to be set.

8. In the control device of the above-described embodiment, the obtaining means obtains the information of the user via the communication means.

According to this embodiment, when the vehicle has a function of collecting the information of the user, the information can be collected appropriately. Furthermore, as it is possible to obtain feedback on information that is obtained as a result of the use of the vehicle by the user, the output of the vehicle can be updated so that the settings are more suited for the user.

9. In the control device of the above-described embodiment, the control means controls the vehicle by transmitting a signal to the vehicle via the communication means.

According to this embodiment, the vehicle can be appropriately notified of the result of processing performed by the control device.

10. Regarding the control device of the above-described embodiment, the control device is installed in the vehicle.

According to this embodiment, when the vehicle side has a sufficient processing capability, the vehicle can independently determine the output to be set. As a result, the vehicle need not perform communication, and thus can set an appropriate output in a location with a poor communication environment. Furthermore, as there is no time lag associated with communication, the vehicle can promptly set the output, and can perform real-time update of the settings in some cases.

11. A system of the above-described embodiment is a system for controlling a vehicle, and includes: obtaining means for obtaining information of a user of the vehicle; and control means for, based on the information of the user, controlling output of the vehicle on a per-user basis.

According to this embodiment, when one vehicle is shared by one or more users, the output of that one vehicle can be set in a style suited for each user by, for example, a collection of one or more devices, such as a cloud.

12. A method of the above-described embodiment is a method for controlling a vehicle, the method being executed by a device or a system and including: obtaining information of a user of the vehicle (e.g., S301); and based on the information of the user, controlling output of the vehicle on a per-user basis (e.g., 302, 303).

According to this embodiment, when one vehicle is shared by one or more users, the output of that vehicle can be set in a style suited for each user.

13. A program of the above-described embodiment is a program for causing a computer in a device or a system to control a vehicle, the program causing: obtainment of information of a user of the vehicle; and control over output of the vehicle on a per-user basis based on the information of the user.

According to this embodiment, when one vehicle is shared by one or more users, the output of that vehicle can be set in a style suited for each user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device for controlling a vehicle, comprising:
an obtaining unit configured to obtain information of a user of the vehicle; and
a control unit configured to, based on the information of the user, control output of the vehicle on a per-user basis,
wherein the information of the user includes information related to a driver's license held by the user, and
the control unit controls, based on the information of the driver's license, a color that illuminates a license plate of the vehicle so as to correspond to a type of a vehicle that is permitted to be driven by the user.

2. The control device according to claim 1, wherein the information of the user includes information of a nationality or a place of residence of the user.

3. The control device according to claim 2, wherein the control unit determines, based on the information of the nationality or the place of residence, a language used on a presentation unit configured to present information to the user in the vehicle, and controls the presentation unit to perform at least one of screen output and audio output using the language.

4. The control device according to claim 1, wherein based on the information of the driver's license, the control unit controls engine displacement or motor output of the vehicle.

5. The control device according to claim 1, wherein the control device is a device that exists outside the vehicle, and
the control device further comprises a communication unit configured to communicate with the vehicle.

6. The control device according to claim 5, wherein the obtaining unit obtains the information of the user via the communication unit.

7. The control device according to claim 5, wherein the control unit controls the vehicle by transmitting a signal to the vehicle via the communication unit.

8. The control device according to claim 1, wherein the control device is installed in the vehicle.

9. A system for controlling a vehicle, comprising:
an obtaining unit configured to obtain information of a user of the vehicle; and
a control unit configured to, based on the information of the user, control output of the vehicle on a per-user basis,
wherein the information of the user includes information related to a driver's license held by the user, and
the control unit controls, based on the information of the driver's license, a color that illuminates a license plate of the vehicle so as to correspond to a type of a vehicle that is permitted to be driven by the user.

10. A method for controlling a vehicle, the method being executed by a device or a system, the method comprising:
obtaining information of a user of the vehicle; and
based on the information of the user, controlling output of the vehicle on a per-user basis,
wherein the information of the user includes information related to a driver's license held by the user, and
a color that illuminates a license plate of the vehicle is controlled, based on the information of the driver's license, so as to correspond to a type of a vehicle that is permitted to be driven by the user.

11. A non-transitory computer-readable storage medium that stores a program for causing a computer in a device or a system to control a vehicle to:
obtain information of a user of the vehicle; and
control output of the vehicle on a per-user basis based on the information of the user,
wherein the information of the user includes information related to a driver's license held by the user, and
a color that illuminates a license plate of the vehicle is controlled, based on the information of the driver's license, so as to correspond to a type of a vehicle that is permitted to be driven by the user.

* * * * *